(12) United States Patent
Osborn et al.

(10) Patent No.: US 12,368,593 B2
(45) Date of Patent: Jul. 22, 2025

(54) SECURE SMART CARD SIGNING DIGITAL DOCUMENTS AND VALIDATION

(71) Applicant: Capital One Services, LLC, McLean, VA (US)

(72) Inventors: Kevin Osborn, Newton Highlands, MA (US); Srinivasa Chigurupati, Long Grove, IL (US)

(73) Assignee: Capital One Services, LLC, McLean, VA (US)

( * ) Notice: Subject to any disclaimer, the term of this patent is extended or adjusted under 35 U.S.C. 154(b) by 171 days.

(21) Appl. No.: 17/685,867

(22) Filed: Mar. 3, 2022

(65) Prior Publication Data
US 2023/0283478 A1     Sep. 7, 2023

(51) Int. Cl.
*H04L 29/00* (2006.01)
*H04L 9/32* (2006.01)
*H04L 9/00* (2022.01)

(52) U.S. Cl.
CPC .......... *H04L 9/3234* (2013.01); *H04L 9/3242* (2013.01); *H04L 9/3247* (2013.01); *H04L 9/50* (2022.05)

(58) Field of Classification Search
CPC ... H04L 9/3234; H04L 9/3242; H04L 9/3247; H04L 9/50; H04L 9/0637; H04L 9/0866
See application file for complete search history.

(56) References Cited

U.S. PATENT DOCUMENTS

| | | |
|---|---|---|
| 10,425,230 B1 | 9/2019 | Tang et al. |
| 10,909,544 B1 * | 2/2021 | Osborn .............. G06Q 30/0233 |
| 10,979,227 B2 | 4/2021 | Ebrahimi |
| 10,992,469 B2 | 4/2021 | Cheng et al. |
| 2009/0089584 A1 | 4/2009 | Bender et al. |
| 2015/0088756 A1 | 3/2015 | Makhotin et al. |
| 2015/0121074 A1 | 4/2015 | Devanand et al. |
| 2016/0012432 A1 * | 1/2016 | Meshkati ............. G06Q 20/322 705/44 |
| 2018/0302226 A1 * | 10/2018 | Heimlicher ........... H04L 63/061 |

(Continued)

FOREIGN PATENT DOCUMENTS

WO     2021101632 A1     5/2021

OTHER PUBLICATIONS

International Search Report and Written Opinion directed to related application No. PCT/US2023/63705, mailed Jul. 18, 2023, 16 pages.

*Primary Examiner* — Ghazal B Shehni
(74) *Attorney, Agent, or Firm* — Sterne, Kessler, Goldstein & Fox P.L.L.C.

(57) ABSTRACT

Disclosed herein are system, method, and computer program product embodiments for signing a document by generating a hash value using a smart card. The smart card can receive from a computing device a first hash value generated for the document based on a first hash function, determine a private key based on a private key information stored on the smart card, sign the first hash value by generating a second hash value based on the first hash value using a second hash function and the private key. The second hash value is to authenticate that the second hash value is generated by the smart card based on the first hash value and the private key. The smart card can further assemble a signature package including the second hash value, and transmit the signature package to the computing device.

20 Claims, 8 Drawing Sheets

(56) References Cited

U.S. PATENT DOCUMENTS

| | | |
|---|---|---|
| 2019/0251573 A1 | 8/2019 | Toyota et al. |
| 2019/0394052 A1 | 12/2019 | Li et al. |
| 2020/0106619 A1* | 4/2020 | Osborn .................. G06Q 20/34 |
| 2020/0234295 A1* | 7/2020 | Newman ................... H04L 9/14 |
| 2020/0274866 A1* | 8/2020 | Vilmos ................ H04L 9/0825 |
| 2020/0295938 A1* | 9/2020 | Matovsky ............. H04L 9/3226 |
| 2020/0374113 A1 | 11/2020 | Noam et al. |
| 2020/0402049 A1* | 12/2020 | Pi Farias .............. G06Q 20/208 |

* cited by examiner

SECURE SMART CARD SIGNING DIGITAL DOCUMENTS AND VALIDATION

BACKGROUND

Electronic commerce and e-government may conduct business by relying on online documents or digital documents, which often have to be signed online. A user may identify himself or herself and sign the documents. A user can use a personal computer, laptop, tablet, smart phone, etc. to digitally sign documents on company's web sites and other online electronic applications. One of the security challenges in commerce and e-government is trusted electronic or digital signing of online documents.

BRIEF SUMMARY

Disclosed herein are system, apparatus, device, method and/or computer program product embodiments, and/or combinations and sub-combinations thereof for signing an information source, e.g., an online document or a digital document, by, e.g., generating a hash value using a smart card. Signing a document using a smart card can have increased security compared to signing the document using a personal computer. Since a smart card may have limited size memory, instead of sending the information source itself to the smart card, a first hash value of the information source can be generated using a first hash function and sent to the smart card for signing. The first hash value can have a smaller size compared to the information source, hence the first has value can be received by the smart card that has a limited size memory. Afterwards, the smart card can be used to sign the first hash value by generating a second hash value using a second hash function. The second hash value can be used to authenticate that the second hash value is generated by the smart card based on the first hash value and a private key.

In some examples, a smart card can include a memory, a communication interface, and a processor coupled to the memory and the communication interface. The communication interface can be operatively coupled to a computing device through a card reader. The memory can be configured to store private key information related to a private key. The processor can be configured to receive a first hash value through the communication interface, where the first hash value can be generated for an information source based on a first hash function. The processor can be further configured to determine the private key based on the private key information, sign the first hash value by generating a second hash value based on the first hash value using a second hash function. The second hash value can be used to authenticate that the second hash value is generated by the smart card based on the first hash value and the private key. The processor can be further configured to assemble a signature package including the second hash value, and transmit the signature package through the communication interface to the computing device.

Descriptions provided in the summary section represent only examples of the embodiments. Other embodiments in the disclosure may provide varying scopes different from the description in the summary. In some examples, systems and computer program products of the disclosed embodiments may include a computer-readable device storing computer instructions for any of the methods disclosed herein or one or more processors configured to read instructions from the computer readable device to perform any of the methods disclosed herein.

BRIEF DESCRIPTION OF THE DRAWINGS

The accompanying drawings, which are incorporated herein and form a part of the specification, illustrate embodiments of the present disclosure and, together with the description, further serve to explain the principles of the disclosure and to enable a person skilled in the arts to make and use the embodiments.

In the drawings, like reference numbers generally indicate identical or similar elements. Additionally, generally, the left-most digit(s) of a reference number identifies the drawing in which the reference number first appears.

DETAILED DESCRIPTION

Figure 1:
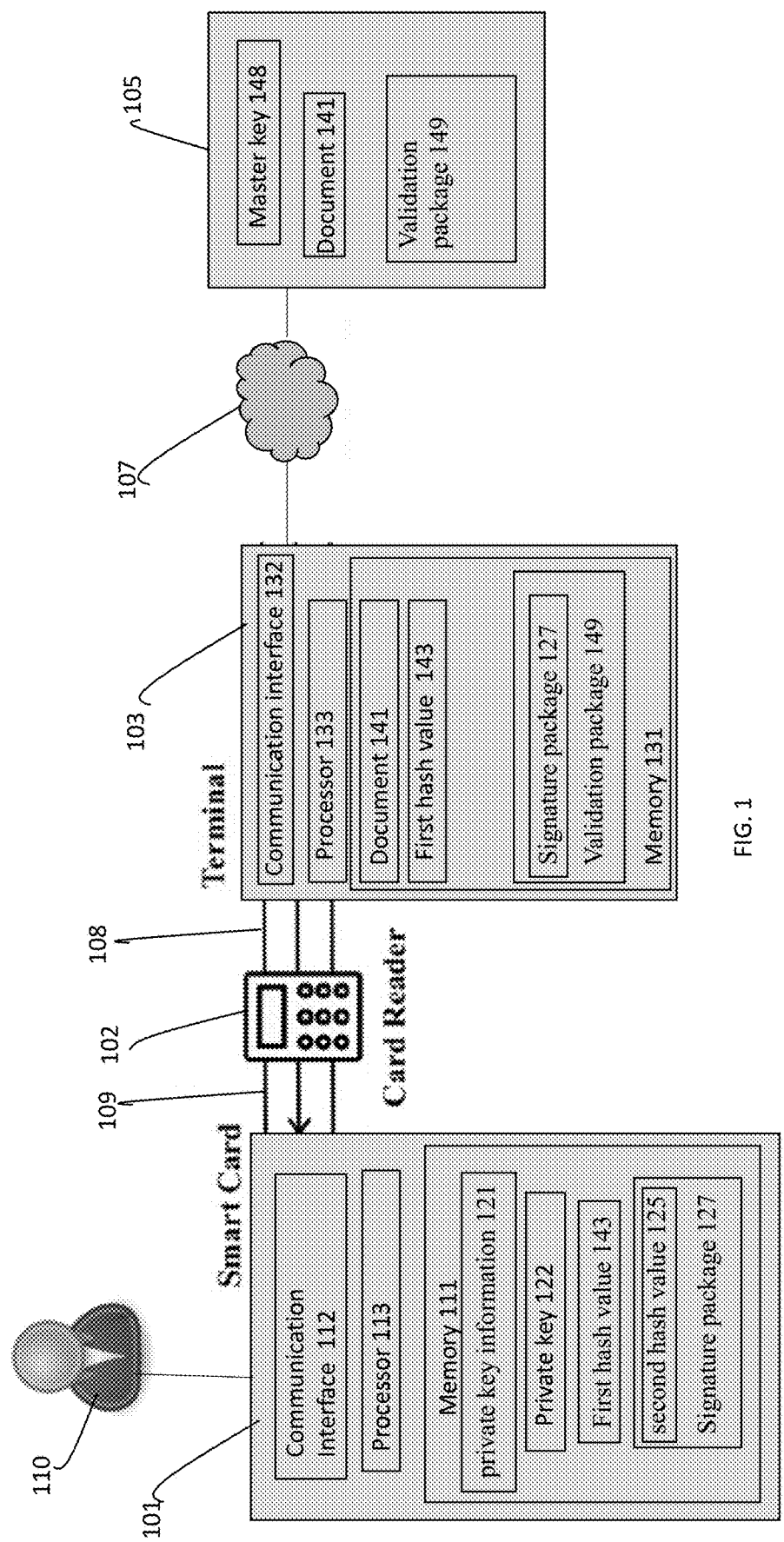
FIG. 1 is a block diagram of a system, according to some embodiments.

One of the security challenges in electronic commerce and e-government applications is trusted electronic or digital signing of online documents to generate a digital signature. Digital signatures can include any electronic data that carries the intent of a signature. A digital signature can be a cryptographic layer of validation and security that is applied to an information source to ensure and validate the authenticity and integrity of the information source, such as a message, software, digital document, or any other information source. When a person applies his or her digital signature to an information source, the receiver can be certain that the entire information source was authenticated or approved by the owner of the digital signature, and that no part of the information source has been altered in transit. An information source may refer to a message, software, a digital document, an online document, a document, or any other similar terms known to a person having ordinary skills in the art. Hence, an information source and a document may be used interchangeably.

In one aspect, during a digital signing process, a signing algorithm can be applied to an information source and a private key to produce a digital signature. A digital signature can be generated by asymmetric cryptography that employs a pair of a public key and a private key. A private key can be stored on a user's computer, and protected by a local password. Storing the private key in a computer can have some disadvantages, since the security of the private key depends on the security of the computer.

In another aspect, an alternative for digital signing of an information source can be used that stores the private key on a smart card. Signing a digital document with a smart card may provide improved security. Examples of smart cards can include payment cards like credit or debit cards, access control card as used by educational institutions, government authorities, etc., for access control. Smart cards can allow for security and convenience of transactions. A smart card can have a memory of a limited or small size, e.g., 512 kilobytes. Such a small memory may post some challenges to sign a large size information source, e.g., a document or an image.

Some embodiments herein can provide mechanisms for signing an information source, e.g., an online document, using a smart card. Since a smart card may have a small memory of a limited size, a first hash value of the information source, instead of the information size itself, can be generated using a first hash function and sent to the smart card. The first hash value can have a smaller size compared to the information source, hence can be received by the smart card having a small size memory. Afterwards, the smart card can be used to sign the first hash value by generating a second hash value using a second hash function based on the first hash value. The second hash value can be used to authenticate that the second hash value is generated by the smart card based on the first hash value and a private key. It is to be appreciated that a digital signature is only an example of the second hash value.

Some embodiments herein can provide improved protection by generating the second hash value based on the first hash value and a private key, where the second hash value may include a conventional digital signature, but may also include other alternatives. In addition to the digital signature used in a signing algorithm based on asymmetric cryptography that employs a pair of a public key and a private key, some embodiments herein can generate a message authentication code (MAC) based on symmetric cryptography, where the MAC can be an example of or an alternative to a digital signature. A MAC can be generated by a private key, and validated by a corresponding private key, instead of validation by a corresponding public key applied to a conventional digital signature.

Accordingly, in some embodiments to facilitate the added flexibility that may not be offered by the asymmetric cryptography based digital signature, a smart card in embodiments herein can store private key information related to a private key, which may be different from the private key. The smart card can determine the private key based on the private key information. In some embodiments, the private key information includes the private key and a public key corresponding to the private key, and the second hash value includes a digital signature generated by applying the private key and the second hash function to the first hash value. In some other embodiments, the private key information can include an identifier, a unique derivation key (UDK) associated with a master key, and a counter, without storing the private key itself. Instead, the private key can be a session key generated based on the UDK, the identifier, and the counter. The private key generated based on the UDK, the identifier, and the counter may be different each time it is used. Such a dynamic private key can provide increased security compared to a private key saved in a computer and used every time a digital signature is generated. In such cases, the second hash value may include a MAC generated by applying the session key and the second hash function to the first hash value. Accordingly, by using the private key information, which may contain more content than a private key only, embodiments herein can provide additional and flexible signing mechanisms, e.g., by using a digital signature or using a MAC.

FIG. 1 is a block diagram of a system 100, according to some embodiments. For example, system 100 can be used to sign an information source, e.g., a document 141, using a smart card 101 based on a private key, and validate the signing by the smart card, according to some embodiments. It is to be understood that there may be more or fewer components included in system 100. Further, it is to be understood that one or more of the devices and components within system 100 may include additional and/or varying features from the description below, and may include any devices and components that one having ordinary skill in the art would consider and/or refer to as signing an information source and validate the signing by the smart card.

In some embodiments, system 100 can include smart card 101, a card reader 102, a computing device 103, and a server 105 operatively coupled to each other. In some embodiments, smart card 101 can include a memory 111, a communication interface 112, and a processor 113 coupled to memory 111 and communication interface 112. The communication interface 112 can be operatively coupled to computing device 103 through card reader 102. Similarly, computing device 103 can also include a memory 131, a communication interface 132, and a processor 133 coupled to memory 131 and communication interface 132. In some embodiments, computing device 103 can be coupled to server 105 by a network 107, and coupled to card reader 102 by a connection 108, while card reader 102 can be coupled to smart card 101 by a connection 109 through communication interface 112.

In some embodiments, communication interface 112 may include a remote radio frequency interface to connect to card reader 102 through connection 109. Connection 109 between card reader 102 and smart card 101 may be through contact or contactless. Card reader 102 may be a peripheral device of computing device 103, and coupled to computing device 103 by connection 108. Connection 108 can be a wired cable, such as a universal serial bus (USB) cable, other cable, or a wireless connection. In some embodiments, card reader 102 and computing device 103 can be an integrated device assembled on a printed circuit board (PCB).

In some embodiments, user 110 can sign document 141 using smart card 101. Document 141 can be sent from server 105 to computing device 103 for signing by user 110 using smart card 101. Computing device 103 can receive document 141 from server 105, store document 141 into memory 131, generate a first hash value 143 for document 141 using a first hash function, send the first hash value 143 to smart card 101 for signing by user 110 to generate a second hash value 125, and receive a signature package 127 from smart card 101 that includes the second hash value 125. Signature package 127 and the second hash value 125 can be used to authenticate that the second hash value 125 is generated by smart card 101 based on the first hash value 143 and a private key 122, which may be determined based on private key information 121 stored in memory 111 of smart card 101. Computing device 103 can receive signature package 127 from smart card 101, and can generate a validation package 149 to be transmit to server 105.

In some embodiments, smart card 101 receives the first hash value 143 from computing device 103 through card reader 102, determines private key 122 based on private key information 121 stored on smart card 101, signs the first hash value 143 by generating the second hash value 125, generates signature package 127 that includes the second hash value 125, and transmits signature package 127 to computing device 103. Computing device 103 receives signature package 127, and further assembles validation package 149 to be sent to server 105 to validate the second hash value 125 is signed by smart card 101. Server 105 may validate validation package 149 based on various security mechanism, e.g., based on a master key 148.

In some embodiments, network 107 can be a "computer network" or a "communication network," which are used interchangeably. In some examples, network 107 can include an ad hoc network, an intranet, an extranet, a virtual private network (VPN), a local area network (LAN), a wireless LAN (WLAN), a wide area network (WAN), a wireless wide area network (WWAN), a metropolitan area network (MAN), a portion of the Internet, a portion of the Public Switched Telephone Network (PSTN), a cellular telephone network, a wireless network, a WiFi network, a WiMax network, any other type of network, or a combination of two or more such networks.

In some embodiments, computing device 103 can be a wireless communication device, a smart phone, a laptop, a tablet, a personal assistant, a monitor, a wearable device, an Internet of Thing (IoT) device, a mobile station, a subscriber station, a remote terminal, a wireless terminal, or any other user device. In some other examples, computing device 103 can be a desktop workstation, a server, and/or embedded system, communicatively coupled to server 105 by wired lines, or any combination thereof. Computing device 103 can also be configured to operate based on a wide variety of wireless communication techniques. These techniques can include, but are not limited to, techniques based on 3rd Generation Partnership Project (3GPP) standards. In some examples, computing device 103 can include various components, such as a processor, an operating system, a camera, a storage device coupled to the processor.

In some examples, server 105 can include a server device (e.g., a host server, a web server, an application server, etc.), a data center device, or a similar device. Server 105 can include a processor, an operating system, server applications operated by the processor, and a storage device coupled to the processor. The processor of server 105 can include one or more central processing units (CPUs), and a programmable device (such as a hardware accelerator or a FPGA).

In some examples, document 141 can be a document, a digital document, an electronic document, or a document file, which are used interchangeably. A document can be a file including text content, image or graphic content, audio content, video content, or any other digital contents. A document can be a file converted from a non-digital document, e.g., a paper document, or a file generated by a computer. A document can be in any of the file format, e.g., a word processing format including doc format, PDF format; an image format including joint photographic experts group (JPEG) related format, exchangeable image file format (Exif), tagged image file format (TIFF), graphics interchange format (GIF), portable network graphics (PNG) format, WebP format, or other image format; or a multimedia file format including mp3 audio format, mp4 audio format, avi video format, wmv video format, or any other document format. Techniques, operations, or descriptions provided herein related to a document file can be equally applicable to any information source. For example, techniques described herein can be equally applicable and easily adapted to a multimedia file, e.g., a video file, with no changes or minor changes, which are known to a person having ordinary skills in the art. Document 141 can be any business file, entertainment file, personal file, or a file for any purpose. For example, document 141 can be a mortgage document, a lease, a legal document, an identity document (e.g. identification card, license, or passport) or any other business document or legal document.

In some examples, smart card 101 can be referred to as a chip card, or integrated circuit card (ICC or IC card). Smart card 101 can be a rectangular piece of card, which includes memory 111, communication interface 112, and processor 113 that are embedded by packaging materials such as plastic. Smart card 101 may be convenient to be fitted in wallets or back pockets. Smart card 101 can be used by banks, shops, educational institutions, offices, etc., to carry out different transaction purposes. Smart card 101 can be in different sizes and forms as one having ordinary skill in the art would consider and/or refer to as a smart card.

In some embodiments, memory 111 of smart card 101 can store private key information 121 related to a private key. Private key information can be of various forms, with more details shown in FIGS. 2A-2B. In some embodiments, processor 103 can be configured to receive the first hash value 143 through communication interface 112, the first hash value 143 is generated for document 141 based on a first hash function. Processor 103 can be further configured to determine private key 122 based on private key information 121, sign the first hash value 143 by generating the second hash value 125 based on the first hash value 143 using a second hash function. The second hash value 125 is to authenticate that the second hash value 125 is generated by the smart card 101 based on the first hash value 143 and private key 122. Processor 103 can be further configured to assemble signature package 127 including the second hash value 125, and transmit signature package 127 through communication interface 112 to computing device 103.

Figure 2A:
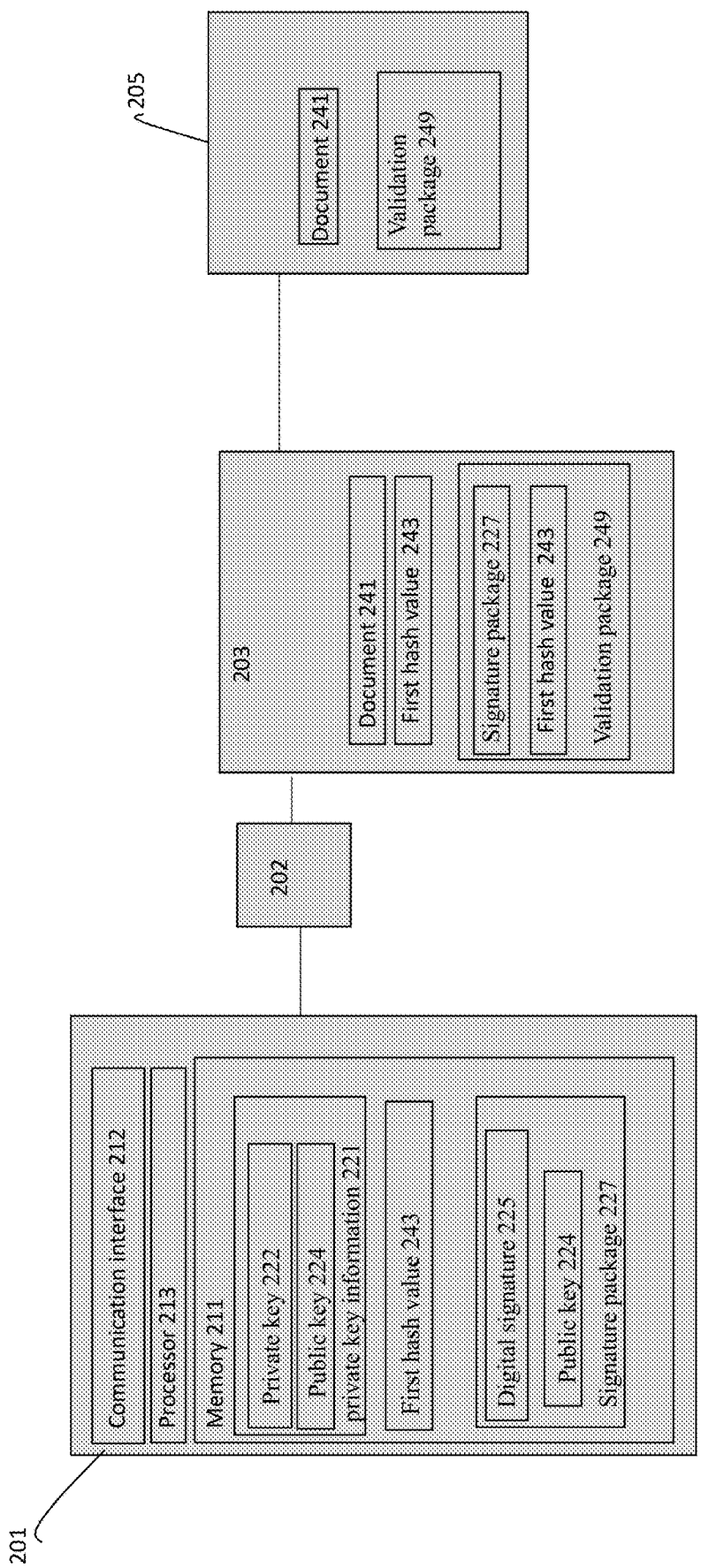
FIGS. 2A-2D illustrate example smart cards, according to some embodiments.

FIG. 2A illustrates a smart card 201, according to some embodiments. For example, smart card 201 can be used as smart card 101. In some embodiments, smart card 201 is coupled to a card reader 202 and a computing device 203, which is further coupled to a server 205. A document 241 can be stored in server 205. Computing device 203 may generate a first hash value 243 for document 241 using the first hash function. Smart card 201 can sign the first hash value 243. Descriptions herein for various components are examples of the descriptions of system 100 in FIG. 1.

In some embodiments, smart card 201 can include a memory 211, a communication interface 212, and a processor 213 coupled to memory 211 and communication interface 212. In addition, smart card 201 can store in memory 211 a private key information 221 related to a private key 222. Smart card 201 can receive the first hash value 243, and further generate a signature package 227.

In some embodiments, private key information 221 includes private key 222 and a public key 224 corresponding to private key 222. In such embodiments, a digital signature 225 is generated by applying private key 222 and the second hash function to the first hash value 243, where digital signature 225 is an example of the second hash value 125 shown in FIG. 1. Signature package 227 may include digital signature 225 and public key 224 to be used to validate digital signature 225. The second hash function used to generate digital signature 225 may be a signing algorithm based on asymmetric cryptography that employs a pair of a public key, e.g., public key 224, and a private key, e.g., private key 222.

In some embodiments, computing device 203 can receive, from server 205, document 241, generate the first hash value 243 for document 241 based on a first hash function, send the first hash value 243 through card reader 202 to smart card 201. In some embodiments, computing device 203 can receive, from smart card 201, signature package 227. Signature package 227 may include a second hash value, e.g., digital signature 225, generated based on the first hash value 243 using a second hash function. Digital signature 225 can be used to authenticate that digital signature 225 is generated by smart card 201 based on the first hash value 243 and private key 222 related to private key information 221. Computing device 203 can identify, in the second hash value, digital signature 225 generated by applying private key 222 related to private key information 221 and the second hash function to the first hash value 243. Computing device 203 can further identify, in signature package 227, digital signature 225 and public key 224 corresponding to private key 222 to be used to validate the digital signature. In some embodiments, computing device 203 can further assemble a validation package 249 that includes signature package 227 and the first hash value 243, and transmit validation package 249 to server 205. Server 205 can use public key 224 included in signature package 227 that is included in validation package 249 to validate that that digital signature 225 included in signature package 227 is a correct digital signature for the first hash value 243 generated for document 241. In some alternative embodiments, validation package 249 may not include the first hash value 243, and server 205 can generate the first hash value 243 when server 205 knows the first hash function used to generate the first hash value 243 by computing device 203.

Figure 2B:
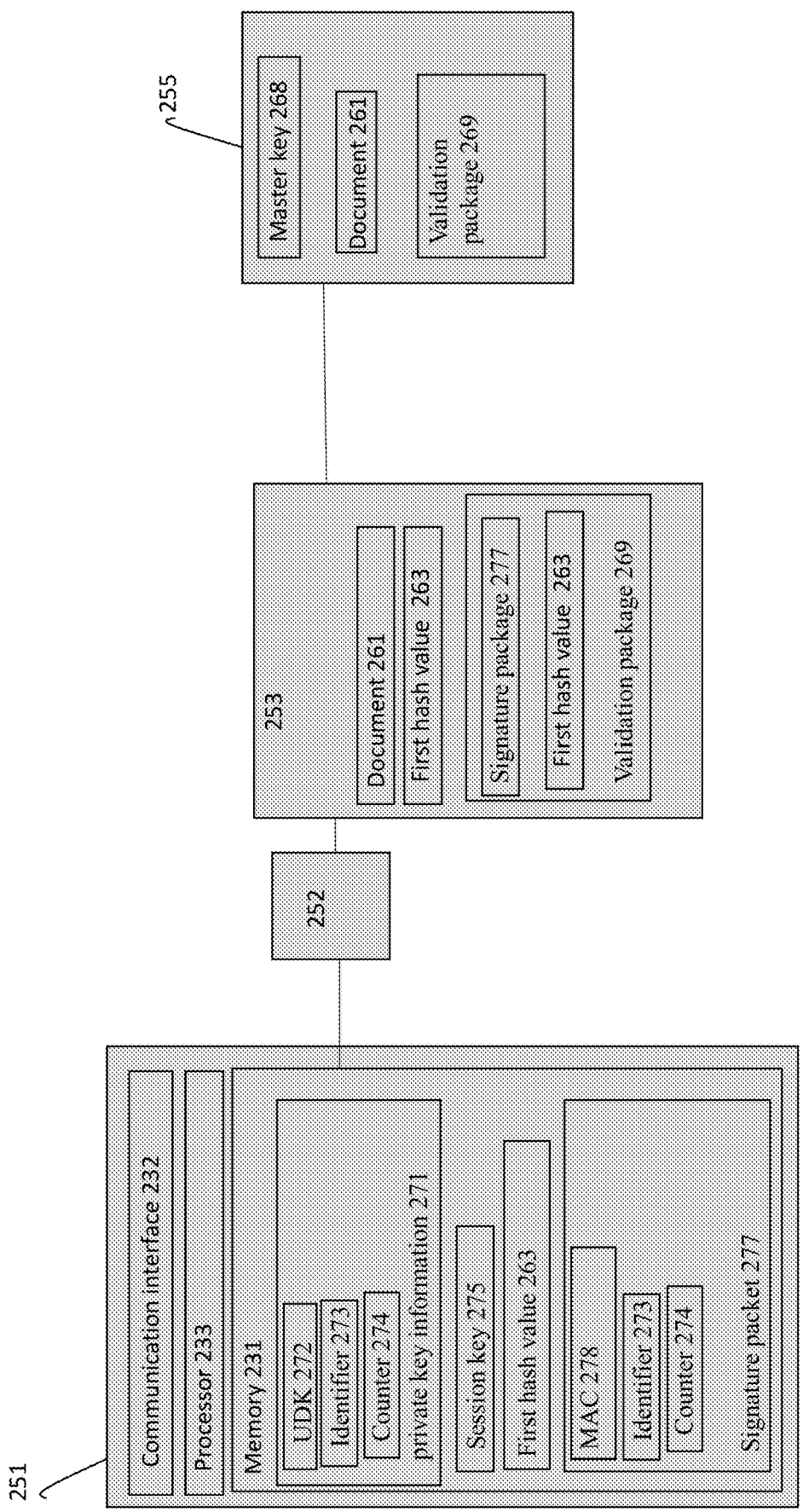

FIG. 2B illustrates a smart card 251, according to some embodiments. For example, smart card 251 can be used as smart card 101. In some embodiments, smart card 251 is coupled to a card reader 252 and a computing device 253, which is further coupled to a server 255. A document 261 is stored in server 255. Computing device 253 can generate a first hash value 263 for document 261 using a first hash function. Smart card 251 can sign the first hash value 263. Descriptions herein for various components are examples of the descriptions of system 100 in FIG. 1.

In some embodiments, smart card 251 can include a memory 231, a communication interface 232, and a processor 233 coupled to memory 231 and communication interface 232. In addition, smart card 251 can store in memory 231 a private key information 271 related to a private key, which may be a session key 275. Smart card 251 can receive the first hash value 263, and further generate a MAC 278 included in a signature package 277. Signature package 277 can include MAC 278, an identifier 273, and a counter 274.

In some embodiments, private key information 271 can include identifier 273, a unique derivation key (UDK) 272 associated with a master key such as a master key 268 stored in server 255, and counter 274. UDK 272 can be generated based on master key 268 stored in server 255, and identifier 273 that uniquely identifies smart card 251. In another aspect, security may be improved when master key 268 may be stored in server 255 only, and is not stored in computing device 253 or smart card 251. Session key 275 can be the private key. Accordingly, in one aspect, private key information 271 does not store the private key, which is session key 275. Therefore, in this aspect, private key information 271 is different from a private key. In this aspect, by storing private key information 271 but not the private key, and generating the private key dynamically, smart card 251 can further improve the security for signing document 261 based on the private key. Master key 268 may be stored inside a hardware security module (HSM) and the validation package would access HSM functions that would implicitly use master key 268 without exporting to external memory. In some examples, the MAC validation may take the message and diversification data and key index as inputs, the HSM would then derive the UDK 272, session key, etc. and compute a MAC and internally compare returning true or false.

Figure 2C:
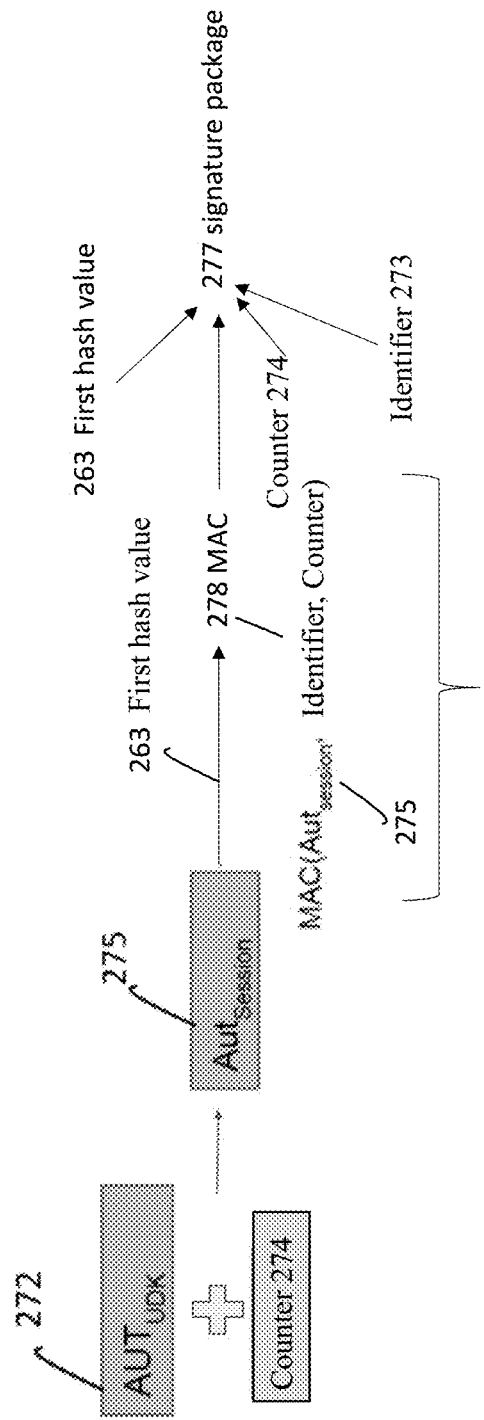

FIG. 2C illustrates a session key 275, according to some embodiments. In one example, session key 275 can be generated based on UDK 272 and counter 274. Smart card 251 can generate MAC 278 by applying session key 275 and the second hash function to the first hash value 263, where MAC 278 can be a second hash value used to authenticate the first hash value 263. In some embodiments, MAC 278 can be a keyed-hash message authentication code (HMAC) generated by a cryptographic hash function, an one-time MAC generated by a k-independent hashing function, or a counter with cipher block chaining message authentication code.

In a cryptography example, MAC 278 can be a short piece of information used to authenticate the first hash value 263 to confirm that signature package 277 came from the stated sender (its authenticity) and has not been changed. MAC 278 can protect data integrity for signature package 277, as well as its authenticity, by allowing server 255 (who also possess session key 275) to detect any changes to signature package 277.

In some embodiments, computing device 253 can receive, from server 255, document 241, generate the first hash value 243 for document 241 based on a first hash function, and send the first hash value 243 through card reader 252 to smart card 251. In some embodiments, computing device 253 can receive, from smart card 251, signature package 277. Computing device 253 can identify MAC 278, identifier 273, and counter 274 in signature package 277. Computing device 253 can assemble validation package 269 including signature package 277 to validate that MAC 278, which can be an example of the second hash value, is generated by smart card 251 based on the first hash value 263 and session key 275. Computing device 253 can further transmit, to server 255, validation package 269 for server 255 to validate that the second hash value, MAC 278, is generated by smart card 251 based on the first hash value 263 and session key 275, which is a private key. In some embodiments, validation package 269 can include signature package 277 and the first hash value 263.

Figure 2D:
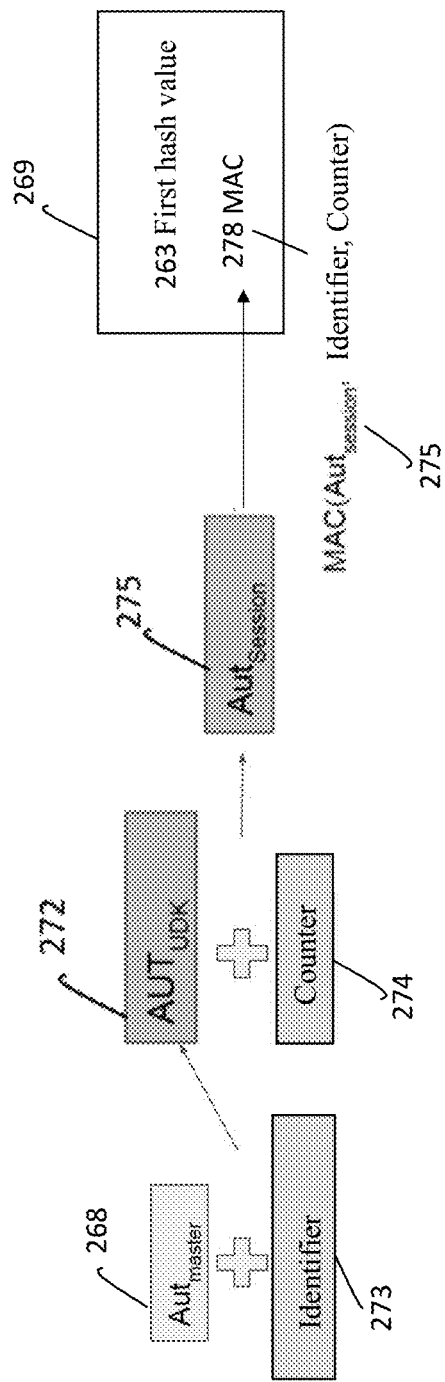

FIG. 2D illustrates session key 275, according to some embodiments. In one example, server 255 can obtain session key 275 based on UDK 272 associated with master key 268. UDK 272 can be generated based on master key 268 and unique identifier 273 that can be included in signature package 277. In some embodiments, session key 275 can be a session key generated based on UDK 272 and counter 274. Counter 274 can record the number of transactions smart card 251 has served, which can be a dynamic number. Hence, the use of unique identifier 273 and counter 274 can further increase the security of session key 275. Server 255 can save various security keys, including master key 268, and other related information. In addition, server 255 can receive identifier 273 and counter 274 from the validation package 269, and verify MAC 278 included in validation package 269 is valid without any unauthorized changes.

Figure 3:
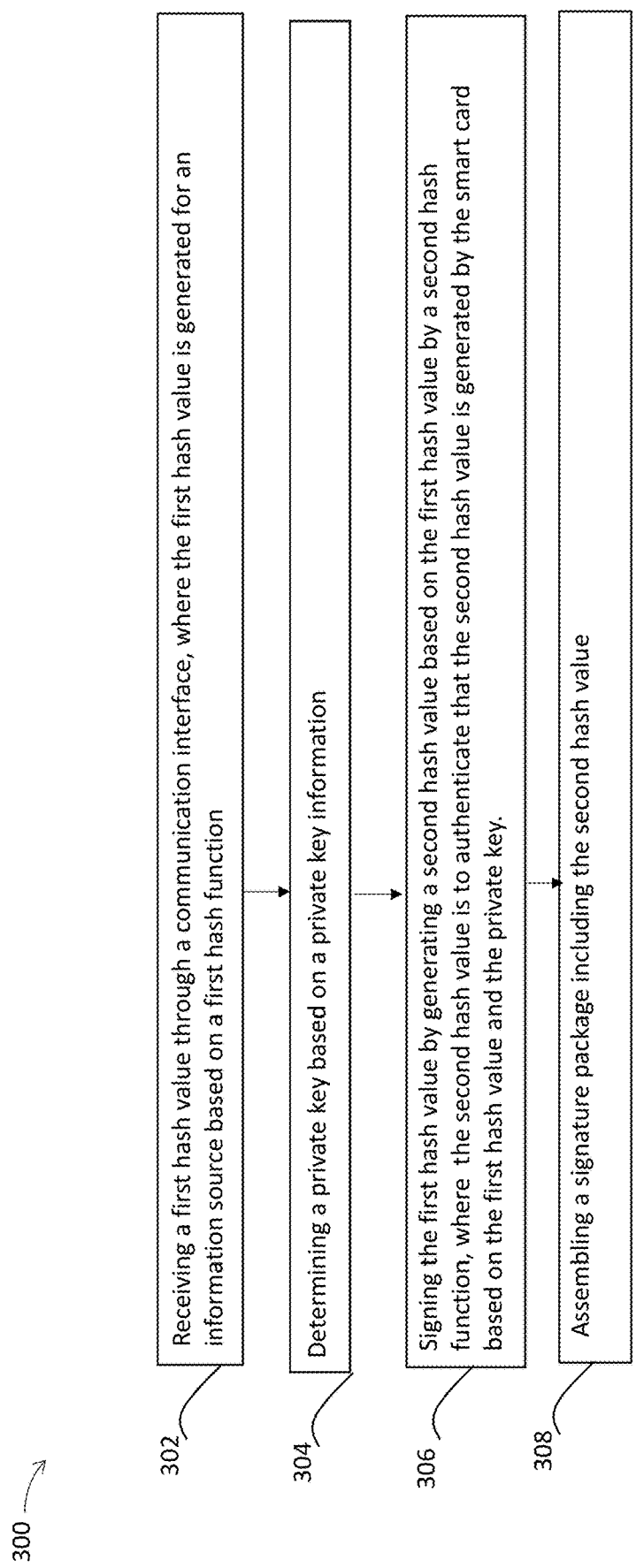
FIGS. 3-4 illustrate example processes, according to some embodiments.
Figure 4:
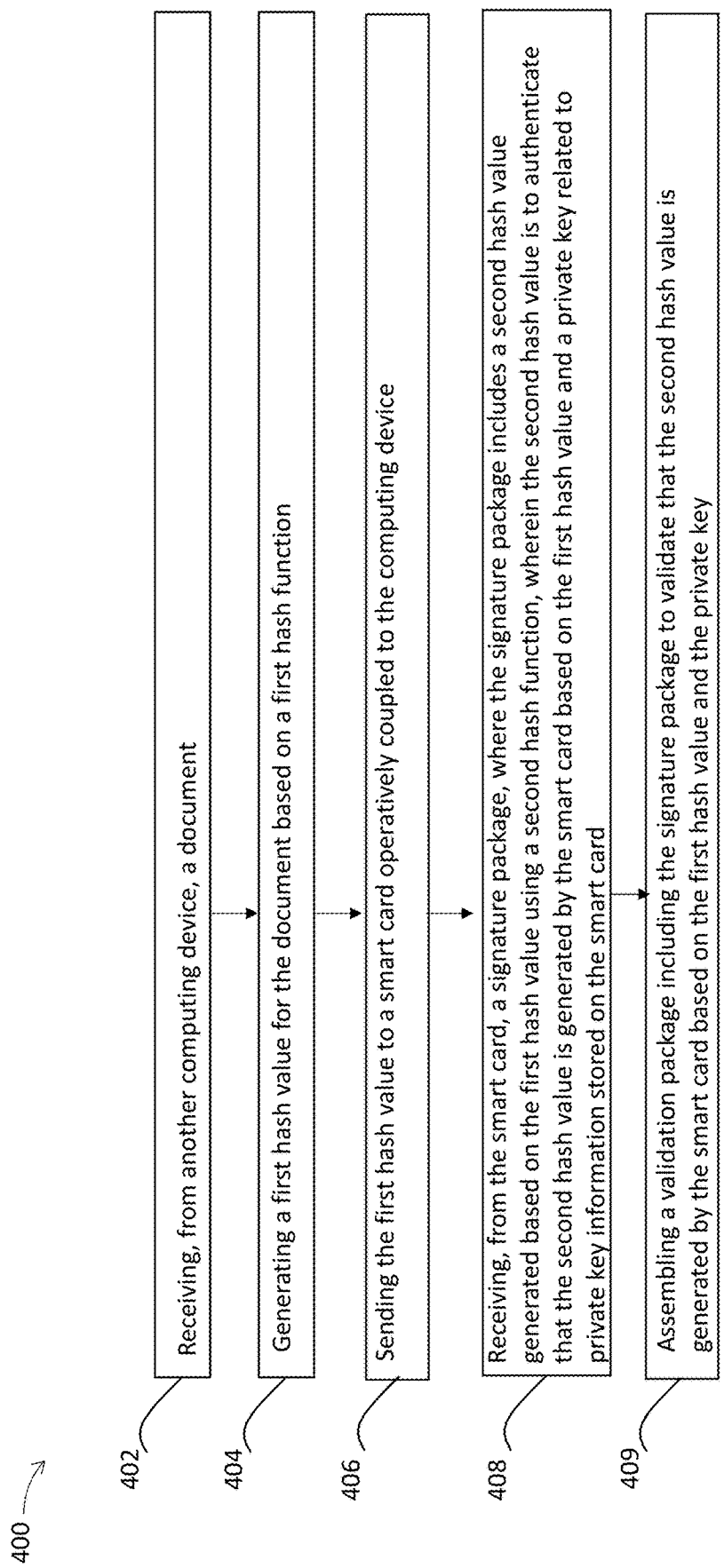

FIGS. 3-4 illustrate example processes, e.g., process 300 and process 400, according to some embodiments. For example, process 300 and/or 400 may be used for signing an information source using a smart card based on a private key. In some embodiments, process 300 can be performed by smart card 101, smart card 201 or smart card 251, while process 400 can be performed by computing device 103, computing device 203, or computing device 253. Process 300 and process 400 can be performed by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIGS. 3-4, as will be understood by a person of ordinary skill in the art.

In operation 302, a smart card can receive a first hash value through a communication interface, where the first hash value can be generated for an information source based on a first hash function. For example, as shown in FIG. 1, smart card 101 can receive the first hash value 143 through communication interface 112, where the first hash value 143 can be generated for an information source, e.g., document 141, based on a first hash function.

In operation 304, the smart card can determine a private key based on the private key information. For example, as shown in FIG. 1, smart card 101 can determine private key 122 based on private key information 121. In some embodiments, private key information 121 may contain private key 122 plus some other information, e.g., a corresponding public key, as shown in FIG. 2A. In some other embodiments, private key information 121 may not contain private key 122 at all, instead, private key 122 may be dynamically generated based on private key information 121, as shown in FIGS. 2B-2C.

In operation 306, the smart card can sign the first hash value by generating a second hash value based on the first hash value using a second hash function, where the second hash value is to authenticate that the second hash value is generated by the smart card based on the first hash value and the private key. For example, as shown in FIG. 1, smart card 101 can sign the first hash value 143 by generating the second hash value 125 based on the first hash value 143 using a second hash function, where the second hash value 125 is to authenticate that the second hash value 125 is generated by smart card 101 based on the first hash value 143 and private key 122.

In operation 308, the smart card can assemble a signature package including the second hash value. For example, as shown in FIG. 1, smart card 101 can assemble signature package 127 including the second hash value 125.

Again, in some embodiments, process 400 can be performed by computing device 103, computing device 203, or computing device 253.

In operation 402, a computing device can receive, from another computing device, a document. For example, as shown in FIG. 1, computing device 103 can receive, from server 105, document 141.

In operation 404, the computing device can generate a first hash value for the document based on a first hash function. For example, as shown in FIG. 1, computing device 103 can generate the first hash value 143 for document 141 based on a first hash function.

In operation 406, the computing device can send the first hash value to a smart card operatively coupled to the computing device. For example, as shown in FIG. 1, computing device 103 can send the first hash value 143 to smart card 101.

In operation 408, the computing device can receive, from the smart card, a signature package, where the signature package includes a second hash value generated based on the first hash value using a second hash function, and the second hash value is to authenticate that the second hash value is generated by the smart card based on the first hash value and a private key related to private key information stored on the smart card. For example, as shown in FIG. 1, computing device 103 can receive, from smart card 101, signature package 127. Signature package 127 can include the second hash value 125 generated based on the first hash value 143 using a second hash function, and the second hash value 125 is to authenticate that the second hash value 125 is generated by smart card 101 based on the first hash value 143 and private key 122 related to private key information 121 stored on smart card 101.

In operation 409, the computing device can assemble a validation package including the signature package to validate that the second hash value is generated by the smart card based on the first hash value and the private key. For example, as shown in FIG. 1, computing device 103 can assemble validation package 149 including signature package 127 to validate that the second hash value 125 is generated by smart card 101 based on the first hash value 143 and private key 122. The validation package may include additional information, such as the first hash value 143.

Figure 5:
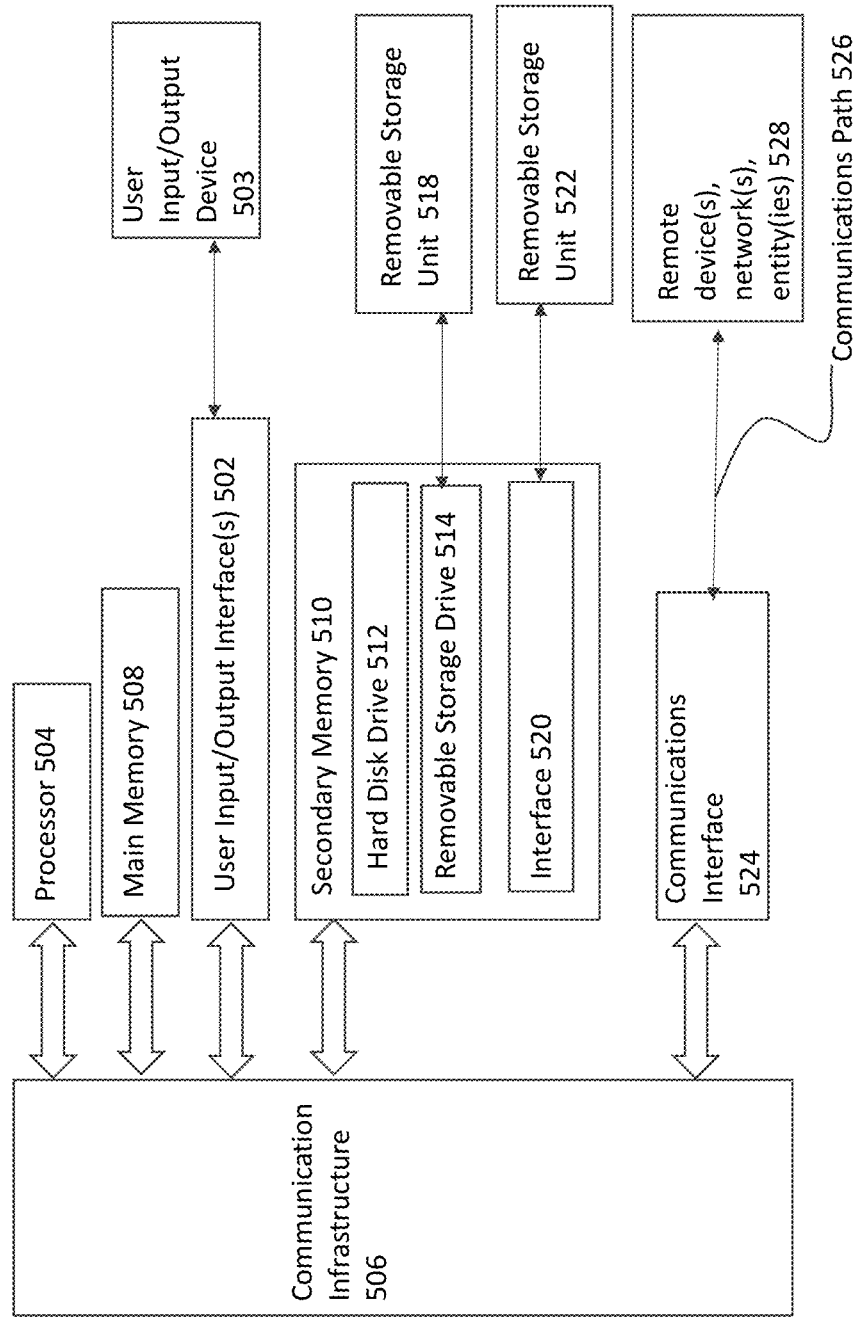
FIG. 5 is an example computer system useful for implementing various embodiments.

FIG. 5 shows a computer system 500, according to some embodiments. Various embodiments may be implemented, for example, using one or more well-known computer systems, such as computer system 500 shown in FIG. 5. One or more computer systems 500 may be used, for example, to implement any of the embodiments discussed herein, as well as combinations and sub-combinations thereof. In some examples, computer system 500 can be used to implement smart card 101, smart card 201, smart card 251, computing device 103, computing device 203, computing device 253, server 105, server 205, server 255, as shown in FIGS. 1, 2A, 2B, or operations shown in FIGS. 3 and 4. Computer system 500 may include one or more processors (also called central processing units, or CPUs), such as a processor 504. Processor 504 may be connected to a communication infrastructure or bus 506.

Computer system 500 may also include user input/output device(s) 503, such as monitors, keyboards, pointing devices, etc., which may communicate with communication infrastructure 506 through user input/output interface(s) 502.

One or more of processors 504 may be a graphics processing unit (GPU). In an embodiment, a GPU may be a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 500 may also include a main or primary memory 508, such as random access memory (RAM). Main memory 508 may include one or more levels of cache. Main memory 508 may have stored therein control logic (i.e., computer software) and/or data.

Computer system 500 may also include one or more secondary storage devices or memory 510. Secondary memory 510 may include, for example, a hard disk drive 512 and/or a removable storage device or drive 514. Removable storage drive 514 may be a floppy disk drive, a magnetic tape drive, a compact disk drive, an optical storage device, tape backup device, and/or any other storage device/drive.

Removable storage drive 514 may interact with a removable storage unit 518. Removable storage unit 518 may include a computer usable or readable storage device having stored thereon computer software (control logic) and/or data. Removable storage unit 518 may be a floppy disk, magnetic tape, compact disk, DVD, optical storage disk, and/any other computer data storage device. Removable storage drive 514 may read from and/or write to removable storage unit 518.

Secondary memory 510 may include other means, devices, components, instrumentalities or other approaches for allowing computer programs and/or other instructions and/or data to be accessed by computer system 500. Such means, devices, components, instrumentalities or other approaches may include, for example, a removable storage unit 522 and an interface 520. Examples of the removable storage unit 522 and the interface 520 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 500 may further include a communication or network interface 524. Communication interface 524 may enable computer system 500 to communicate and interact with any combination of external devices, external networks, external entities, etc. (individually and collectively referenced by reference number 528). For example, communication interface 524 may allow computer system 500 to communicate with external or remote devices 528 over communications path 526, which may be wired and/or wireless (or a combination thereof), and which may include any combination of LANs, WANs, the Internet, etc. Control logic and/or data may be transmitted to and from computer system 500 via communication path 526.

Computer system 500 may also be any of a personal digital assistant (PDA), desktop workstation, laptop or notebook computer, netbook, tablet, smart phone, smart watch or other wearable, appliance, part of the Internet-of-Things, and/or embedded system, to name a few non-limiting examples, or any combination thereof.

Computer system 500 may be a client or server, accessing or hosting any applications and/or data through any delivery paradigm, including but not limited to remote or distributed cloud computing solutions; local or on-premises software ("on-premise" cloud-based solutions); "as a service" models (e.g., content as a service (CaaS), digital content as a service (DCaaS), software as a service (SaaS), managed software as a service (MSaaS), platform as a service (PaaS), desktop as a service (DaaS), framework as a service (FaaS), backend as a service (BaaS), mobile backend as a service (MBaaS), infrastructure as a service (IaaS), etc.); and/or a hybrid model including any combination of the foregoing examples or other services or delivery paradigms.

Any applicable data structures, file formats, and schemas in computer system 500 may be derived from standards including but not limited to JavaScript Object Notation (JSON), Extensible Markup Language (XML), Yet Another Markup Language (YAML), Extensible Hypertext Markup Language (XHTML), Wireless Markup Language (WML), MessagePack, XML User Interface Language (XUL), or any other functionally similar representations alone or in combination. Alternatively, proprietary data structures, formats or schemas may be used, either exclusively or in combination with known or open standards.

In some embodiments, a tangible, non-transitory apparatus or article of manufacture comprising a tangible, non-transitory computer useable or readable medium having control logic (software) stored thereon may also be referred to herein as a computer program product or program storage device. This includes, but is not limited to, computer system 500, main memory 508, secondary memory 510, and removable storage units 518 and 522, as well as tangible articles of manufacture embodying any combination of the foregoing. Such control logic, when executed by one or more data processing devices (such as computer system 500), may cause such data processing devices to operate as described herein. For example, control logic may cause processor 504 to perform operations shown in FIGS. 3-4.

Based on the teachings contained in this disclosure, it will be apparent to persons skilled in the relevant art(s) how to make and use embodiments of this disclosure using data processing devices, computer systems and/or computer architectures other than that shown in FIG. 5. In particular, embodiments can operate with software, hardware, and/or operating system implementations other than those described herein.

It is to be appreciated that the Detailed Description section, and not any other section, is intended to be used to interpret the claims. Other sections can set forth one or more but not all exemplary embodiments as contemplated by the inventor(s), and thus, are not intended to limit this disclosure or the appended claims in any way.

While this disclosure describes exemplary embodiments for exemplary fields and applications, it should be understood that the disclosure is not limited thereto. Other embodiments and modifications thereto are possible, and are within the scope and spirit of this disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments can perform functional blocks, steps, operations, methods, etc. using orderings different than those described herein.

References herein to "one embodiment," "an embodiment," "an example embodiment," or similar phrases, indicate that the embodiment described can include a particular feature, structure, or characteristic, but every embodiment can not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein. Additionally, some embodiments can be described using the expression "coupled" and "connected" along with their derivatives. These terms are not necessarily intended as synonyms for each other. For example, some embodiments can be described using the terms "connected" and/or "coupled" to indicate that two or more elements are in direct physical or electrical contact with each other. The term "coupled," however, can also mean that two or more elements are not in direct contact with each other, but yet still co-operate or interact with each other.

The breadth and scope of this disclosure should not be limited by any of the above-described exemplary embodiments, but should be defined only in accordance with the following claims and their equivalents.

It is to be appreciated that the Detailed Description section, and not the Summary and Abstract sections, is intended to be used to interpret the claims. The Summary and Abstract sections may set forth one or more but not all exemplary embodiments of the present invention as contemplated by the inventor(s), and thus, are not intended to limit the present invention and the appended claims in any way.

The present invention has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present invention should not be limited by any of the above-described exemplary embodiments, but should be defined only in accordance with the following claims and their equivalents.

The claims in the instant application are different than those of the parent application or other related applications. The Applicant therefore rescinds any disclaimer of claim scope made in the parent application or any predecessor application in relation to the instant application. The Examiner is therefore advised that any such previous disclaimer and the cited references that it was made to avoid, may need to be revisited. Further, the Examiner is also reminded that any disclaimer made in the instant application should not be read into or against the parent application.

What is claimed is:

1. A smart card, comprising:
   a memory configured to store private key information related to a private key, wherein the private key information comprises a counter indicative of a number of transactions served by the smart card, an identifier that uniquely identifies the smart card, and a unique derivation key (UDK);
   a communication interface configured to operatively couple the smart card with a computing device; and
   a processor coupled to the memory and the communication interface, and configured to:
      receive, from the computing device, a first hash value through the communication interface, wherein the first hash value is generated for an information source based on a first hash function of the computing device;
      dynamically generate the private key based on the counter, the identifier, and the UDK in response to receiving the first hash value;
      sign the first hash value by generating a second hash value based on the first hash value using a second hash function of the smart card, wherein the second hash function is to authenticate that the second hash value is generated by the smart card based on the first hash value and the private key; and
      assemble a signature package including the second hash value.

2. The smart card of claim 1, wherein the processor is further configured to:
   transmit the signature package through the communication interface to the computing device.

3. The smart card of claim 2, wherein the communication interface is operatively coupled to the computing device through a card reader.

4. The smart card of claim 1, wherein:
   the UDK is associated with a master key;
   the second hash value includes a message authentication code (MAC) generated by applying the private key and the second hash function to the first hash value; and
   the signature package includes the MAC, the identifier, and the counter.

5. The smart card of claim 4, wherein the UDK is generated based on the master key and the identifier that uniquely identifies the smart card.

6. The smart card of claim 4, wherein the MAC is a keyed-hash message authentication code (HMAC) generated by a cryptographic hash function, a one-time MAC generated by a k-independent hashing function, or a counter with cipher block chaining message authentication code.

7. The smart card of claim 1, wherein the communication interface includes a remote radio frequency interface configured to contactlessly read the first hash value.

8. A computer-implemented method for a computing device, the method comprising:
   receiving, from another computing device, a document;
   generating a first hash value for the document based on a first hash function of the computing device;
   sending the first hash value to a smart card operatively coupled to the computing device;
   receiving, from the smart card, a signature package, the signature package including a second hash value generated based on the first hash value using a second hash function of the smart card, the second hash function being used to authenticate that the second hash value is generated by the smart card based on the first hash value and a private key dynamically generated based on a counter indicative of a number of transactions served by the smart card, an identifier that uniquely identifies the smart card, and a unique derivation key (UDK) stored on the smart card; and
   assembling a validation package including the signature package to validate that the second hash value is generated by the smart card based on the first hash value and the private key.

9. The method of claim 8, wherein the sending the first hash value to the smart card comprises:
   sending the first hash value through a card reader to the smart card.

10. The method of claim 8, further comprising:
    transmitting, to another computing device, the validation package for another computing device to validate that the second hash value is generated by the smart card based on the first hash value and the private key.

11. The method of claim 8, further comprising:
    identifying, in the second hash value, a message authentication code (MAC) generated by applying the private key and the second hash function to the first hash value, wherein the UDK is associated with a master key, the counter, and the identifier; and
    identifying, in the signature package, the MAC, the identifier, and the counter.

12. The computer-implemented method of claim 8, wherein sending the first hash value to a smart card operatively coupled to the computing device comprises:

sending the first hash value via a communication interface that is operatively coupled to the computing device through a card reader.

13. The computer-implemented method of claim 8, wherein sending the first hash value to a smart card operatively coupled to the computing device comprises:
sending the first hash value via a remote radio frequency interface configured to contactlessly send the first hash value.

14. A non-transitory computer-readable medium storing instructions, the instructions, when executed by a processor, cause the processor to perform operations comprising:
receiving, from a computing device, a first hash value through a communication interface of a smart card, wherein the first hash value is generated for an information source based on a first hash function of the computing device;
dynamically generating a private key based on a counter indicative of a number of transactions served by the smart card, an identifier that uniquely identifies the smart card, and a unique derivation key (UDK) in response to receiving the first hash value;
signing the first hash value by generating a second hash value based on the first hash value using a second hash function of the smart card, wherein the second hash function is to authenticate that the second hash value is generated by the smart card based on the first hash value and the private key; and
assembling a signature package including the second hash value.

15. The non-transitory computer-readable medium of claim 14, further comprising:
transmitting the signature package through the communication interface to the computing device.

16. The non-transitory computer-readable medium 15, wherein the communication interface is operatively coupled to the computing device through a card reader.

17. The non-transitory computer-readable medium of claim 14, further comprising:
wherein the UDK is associated with a master key;
generating, as the second hash value, a message authentication code (MAC) by applying the private key and the second hash function to the first hash value; and
assembling the signature package that includes the MAC, the identifier, and the counter.

18. The non-transitory computer-readable medium of claim 17, wherein the UDK is generated based on the master key and the identifier that uniquely identifies the smart card.

19. The non-transitory computer-readable medium of claim 17, wherein the generating the MAC further comprises generating a keyed-hash message authentication code (HMAC) by a cryptographic hash function, generating a one-time MAC by a k-independent hashing function, or generating a counter with cipher block chaining MAC.

20. The non-transitory computer-readable medium 14, wherein the communication interface includes a remote radio frequency interface configured to contactlessly read the first hash value.

* * * * *